United States Patent
Benedetti et al.

(10) Patent No.: US 6,242,944 B1
(45) Date of Patent: Jun. 5, 2001

(54) REAL-TIME RECONFIGURABLE VISION COMPUTING SYSTEM

(75) Inventors: Arrigo Benedetti, Pasadena; Pietro Perona, Altadeus, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/283,654

(22) Filed: Apr. 1, 1999

Related U.S. Application Data

(60) Provisional application No. 60/080,342, filed on Apr. 1, 1998.

(51) Int. Cl.[7] ................................................. H03K 19/177
(52) U.S. Cl. ................................................. 326/39; 326/38
(58) Field of Search ............................................ 326/37–41

(56) References Cited

U.S. PATENT DOCUMENTS

| | | | | |
|---|---|---|---|---|
| 5,760,607 | * | 9/1998 | Leeds et al. | 326/41 |
| 5,787,007 | * | 7/1998 | Bauer | 326/41 |
| 5,804,986 | * | 9/1998 | Jones | 326/40 |
| 6,055,594 | * | 4/2000 | Lo et al. | 326/41 |

* cited by examiner

*Primary Examiner*—Michael Tokar
*Assistant Examiner*—Don Phu Le
(74) *Attorney, Agent, or Firm*—Fish & Richardson P.C.

(57) ABSTRACT

An image processing system uses an FPGA and an external memory to form neighborhoods for image processing. The FPGA is connected to the external memory in a way that reuses address lines, and increases the effective bandwidth of the operation.

2 Claims, 6 Drawing Sheets

REAL-TIME RECONFIGURABLE VISION COMPUTING SYSTEM

CROSS REFERENCE TO RELATED APPLICATIONS

This application claims the benefit of the U.S. Provisional Application No. 60/080,342, filed on Apr. 1, 1998.

BACKGROUND OF THE INVENTION

Processing of video requires processing of a large amount of information. Typical video has a resolution of 640×480 pixels at 30 frames/sec. This requires processing 9.2 M-bytes/sec for monochrome video, or 27.6 M-bytes/sec for color signal. This large amount of information has often been handled by a special kind of processor. Different kinds of processors have been used to process this large amount of information.

A single instruction multiple data processor is one example of a massively-parallel supercomputer that can be used for this purpose. Application specific integrated circuits "ASICs" have also been used. Both of these technologies have their own host of advantages and disadvantages.

Field-programmable gate arrays (FPGA's) can also be used for processing video. A field-programmable gate array includes a large number of configurable logic blocks (CLB's) and a programmable mesh of interconnections. Static memory cells, which are scattered across the gate array are used to specify the logic of the blocks and the interconnection pattern.

SUMMARY OF THE INVENTION

The present system recognizes that FPGA's can be advantageously used in vision systems of this type. According to the present system, a special memory interface is described which uses FPGAs in a reconfigurable computer system that is optimized for image processing. The FPGAs are used with external components, preferably fast static random access memory ("SRAM"). The bandwidth is increased by sharing interface lines.

DESCRIPTION OF THE PREFERRED EMBODIMENTS

Figure 1:
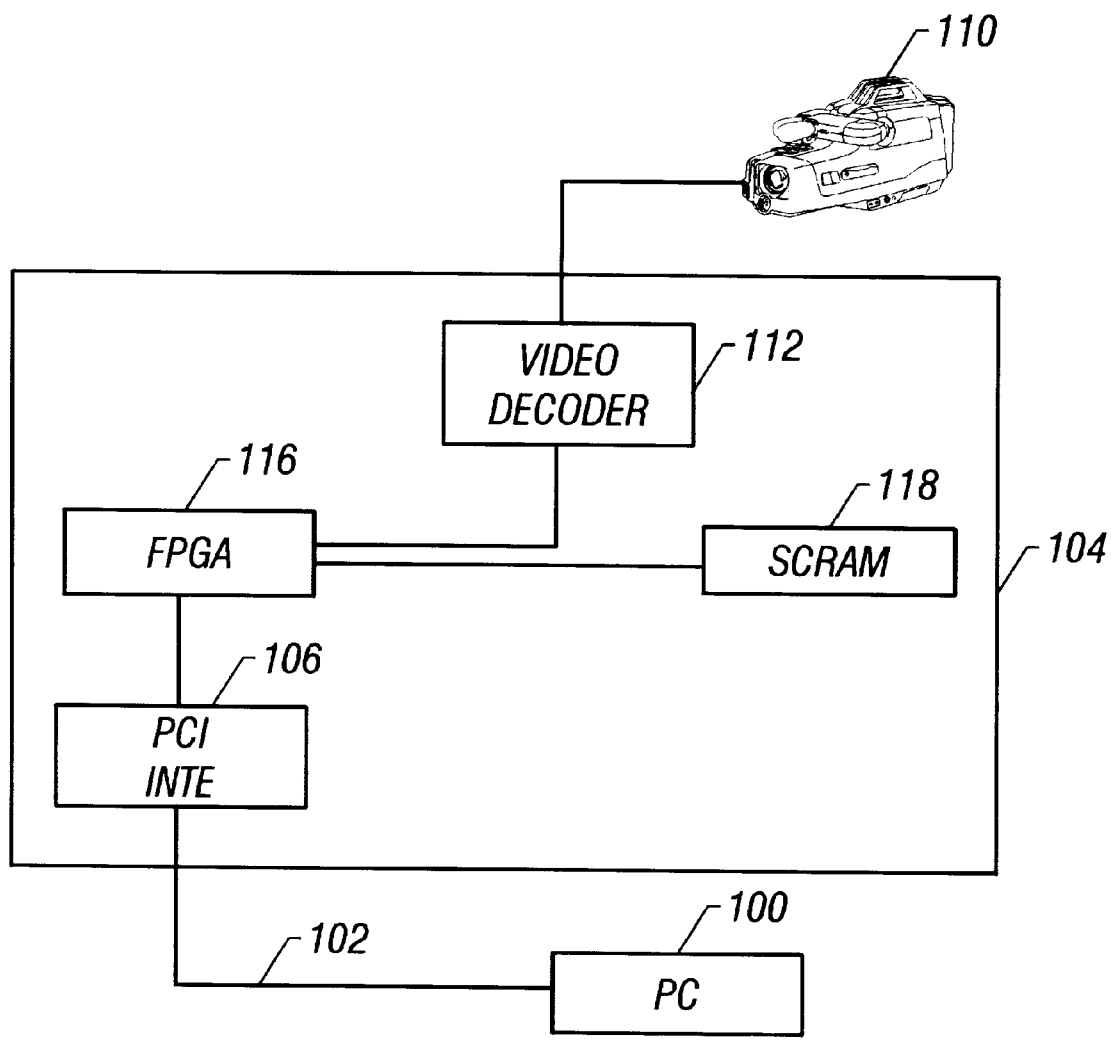
FIG. 1 shows a block diagram of the overall system.

A block diagram of the overall system is shown in FIG. 1. A personal computer 100 is shown with a PCI bus 102. It should be understood that any other processing element could alternatively be used. The basic preferred embodiment is a PCI card 104 having a PCI interface 106 that connects with the PCI bus. The PC carries out high level tasks that may be related image processing. Such tasks are known in the art and are beyond the scope of this discussion. However, as described herein, most image processing elements fall generally into one of several categories. The present system is optimized for operating in those categories.

The image is actually obtained by a video camera 110 which is coupled to a video decoder 112. The output 114 from the video decoder is connected to one or an array of FPGA's 116. The FPGA's operate and are configured as described herein. The FPGA's 116 are also coupled to external circuitry 118 which can be, for example, static random access memories ("SRAMs").

Image processing tasks are often carried out by low-level vision systems. These tasks require both memory and computation resources. Memory resources feed a steady flow of data to computational resources. The data form varies according to the nature of the space where the operation is defined.

Spatial operations take into account all pixels of at least a part of the image. These require the availability of the pixel values belonging to a neighborhood of some geometric shape. For example, the video decoder 112 may typically present the pixel stream in raster scan order. This means that a new pixel is available at every clock cycle. However, the image processing algorithm may typically operate based on a special geometric shape of pixels to be processed.

Figure 2:
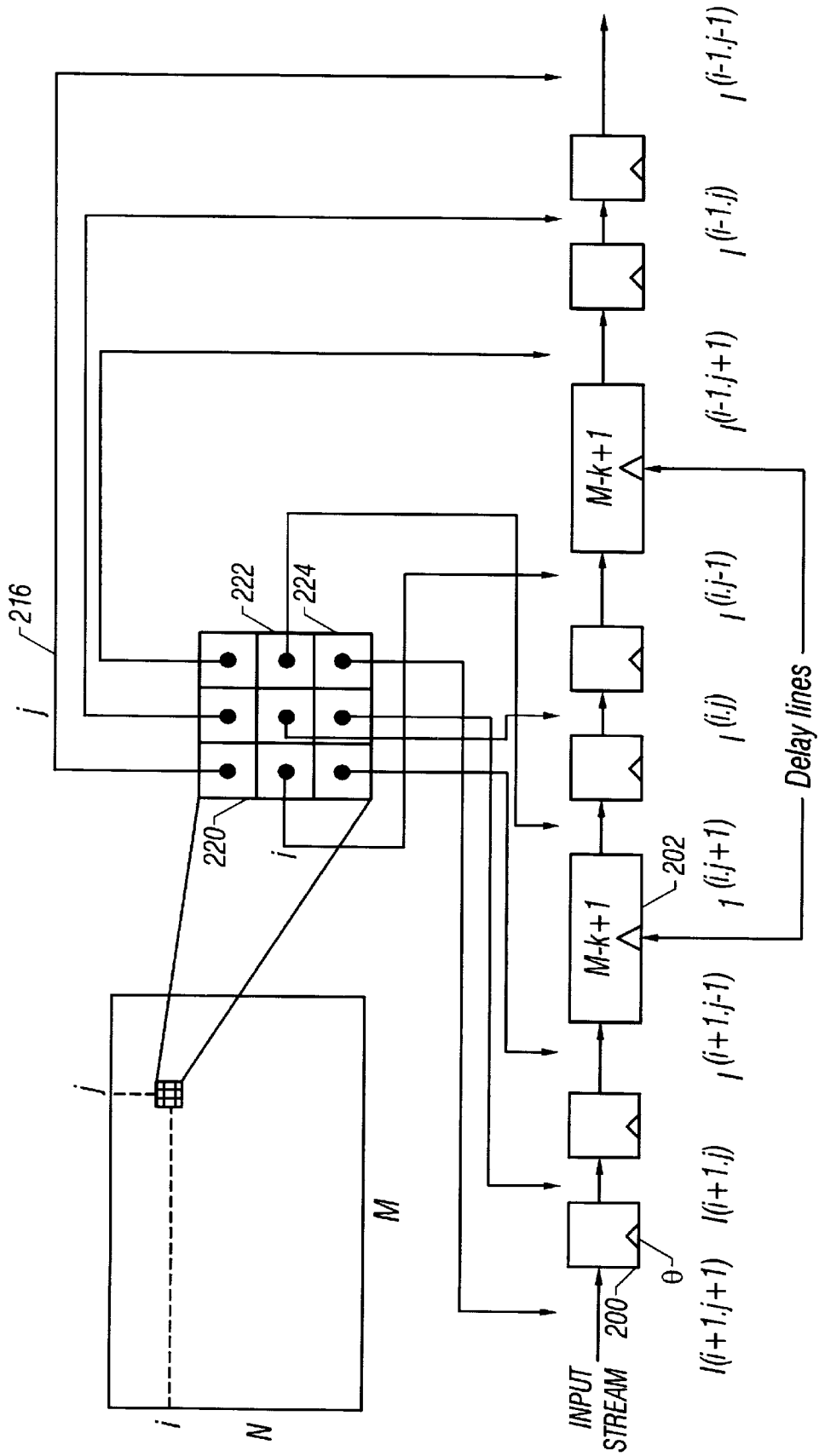
FIG. 2 shows a functional diagram of the formation of a 3×3 neighborhood using delay lines and registers.

One typical operation is the use of a neighborhood. A 3×3 square neighborhood is one typical shape. FIG. 2 shows a circuit configuration that makes available the values of the pixels belonging to a 3×3 square neighborhood. The FIG. 2 system slides across the image. Each clock tick makes available a new neighborhood.

The structure in FIG. 2 comprises a plurality of first-in/first-out memories ("FIFOs") 202. A plurality of clocked delay lines 200 receives a clock $\phi$ that is synchronized with the clock driving the video decoder 112. The first-in/first-out memories 202 have a length M−k+1 where M is the width of the image and k is the size of the square neighborhood, i.e., a k×k neighborhood. Usually k is much less than M.

FIG. 2 shows how the 3×3 neighborhood is assembled each time a new pixel is obtained. The center pixel 210 is formed from the current pixel i,j. The input stream is shifted through registers and FIFOs to obtain the first line 220 of the neighborhood from the input stream (current) pixel. The system also obtains previous information from the input stream. The M−k+1 delay line is used to obtain the middle line 222 and an M−k+1 delay line is used to obtain the last line 224.

The inventors recognized that this can be easily and efficiently effected in an FPGA with external memory structures. Most FPGA's have an abundant number of registers that does not require excessive area on the FPGA. Hence, the registers 200 are implemented by portions of the FPGA's.

One preferred FPGA is a Xilinx XC4000. The CLB's in that FPGA can be configured as 34 bit SRAM cells. However, while this may work for a single video frame, it has been found that most FPGAs do not have sufficient memory to handle pixel values over several frames.

The first-in/first-out memories, however, require a large number of configurable logic blocks, especially when implemented as long shift register chains. The preferred option, therefore, uses external SRAM devices 118 as the FIFO memory.

Figure 3:
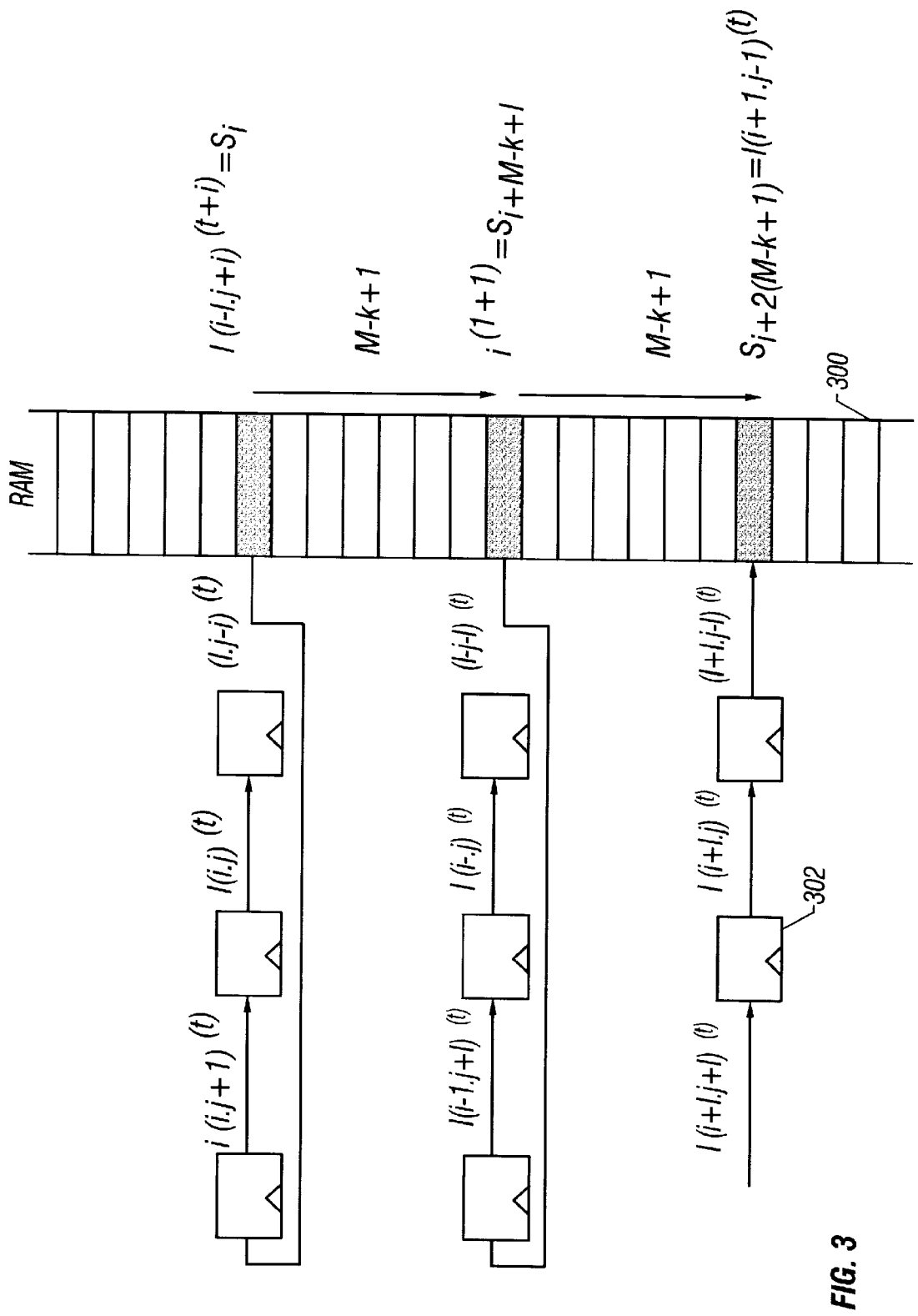
FIG. 3 shows how these delay lines are built using external memory.

FIG. 3 shows a system that uses external synchronous RAM 300 in addition to the FPGA's forming the other device. In FIG. 3, a 3×3 pixel neighborhood is built by using registers, e.g. 302, connected to external RAM 300. The input stream is shifted into desired locations as shown. The FIFOs are implemented as delay lines in this embodiment, by writing the pixel value to the external RAM. The values corresponding to the output of the RAM are then later read. The read addresses are obtained by decrementing the write address by M−k+1. After each pixel cycle, all values are incremented according to $$l_W = (l_W + 1) \bmod 2^q, \quad (1)$$
$$l_{R1} = (l_{R1} + 1) \bmod 2^q,$$
$$l_{R2} = (l_{R2} + 1) \bmod 2^q,$$
$$\vdots$$
$$l_{Rk-1} = (l_{Rk-1} + 1) \bmod 2^q,$$

where q is the number of address lines of the memory device. This means that $2^q \geq (k-1)(M-k+1)$ must be satisfied.

Figure 4:
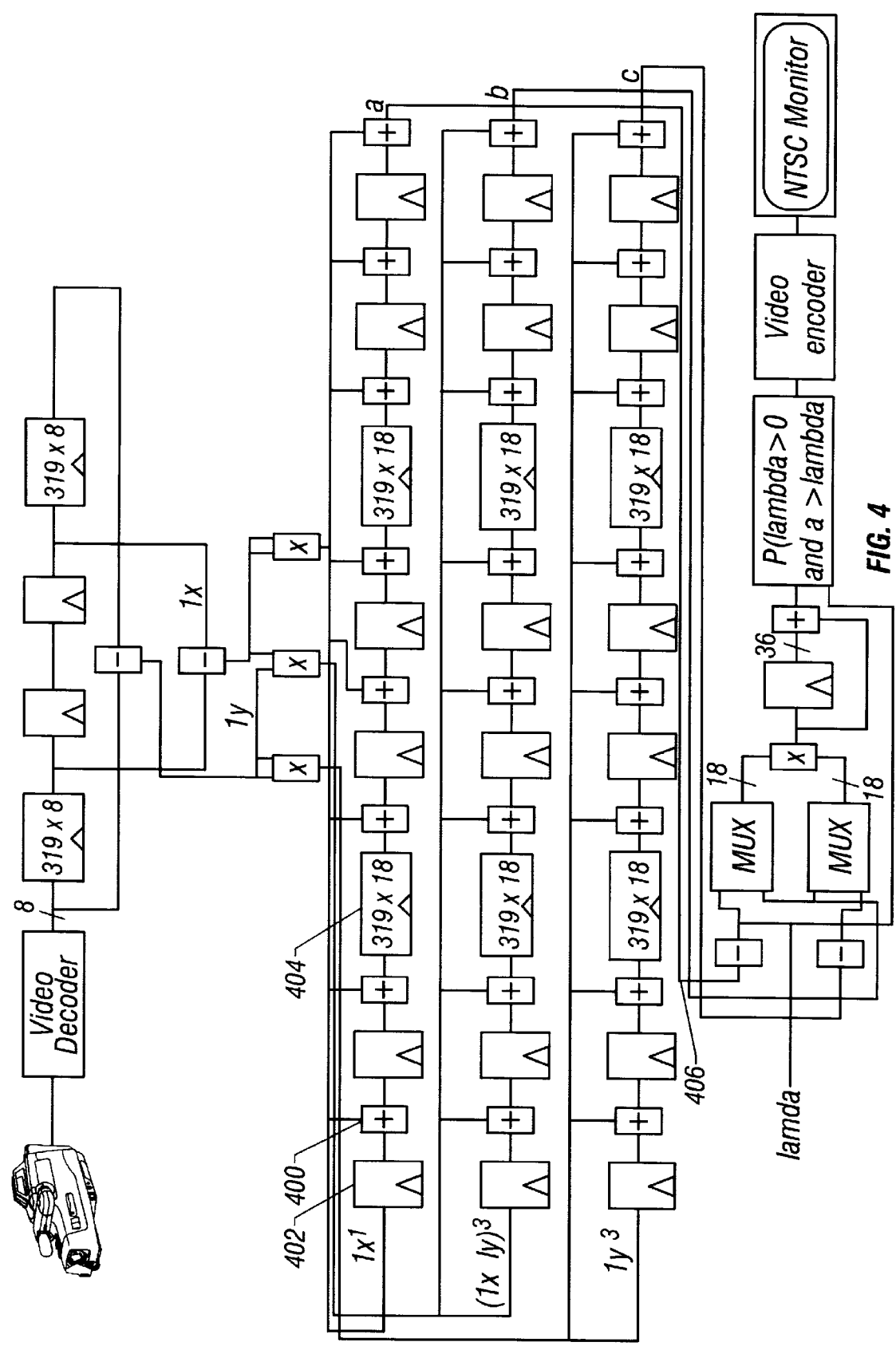
FIG. 4 shows an architecture of a real time video selection system as an embodiment.
Figure 5:
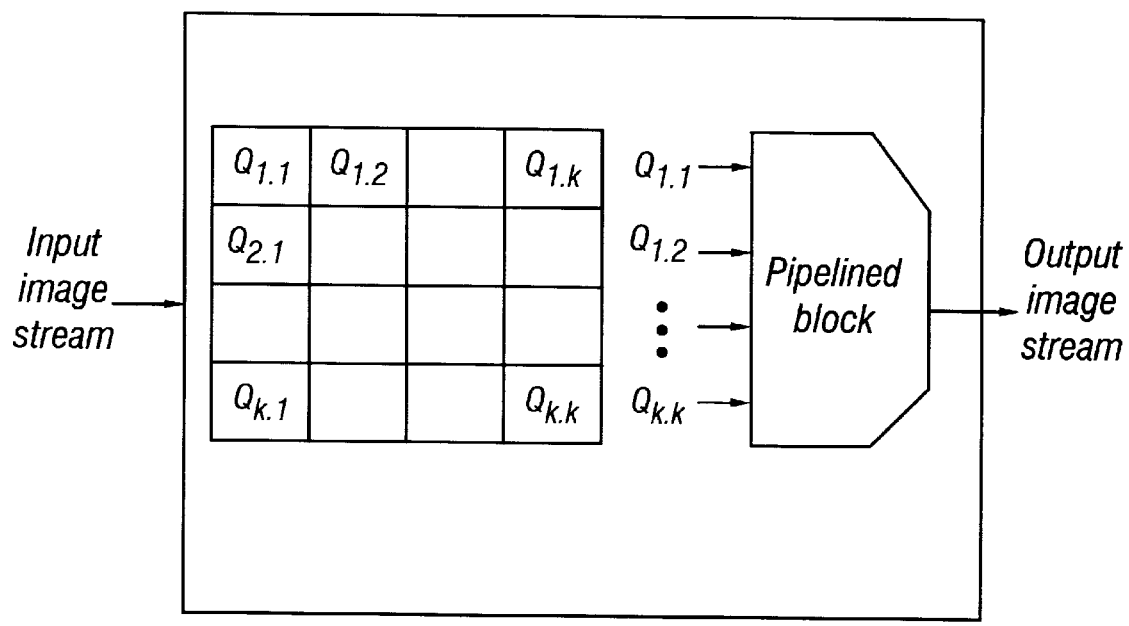
FIG. 5 shows a state diagram of the system used to increase speed.

FIG. 4 shows a schematic logic diagram of a real-time system using this architecture.

The data flow of many image processing systems can be decomposed into a sequence of operations on sets of data. The organization of those sets of data resembles the data of the original image. The FIG. 4 first stage, for example, computes the image gradient components $I_x$ and $I_y$. This is done by convolving the input image with two kernels:

$$[-0.5 \ 0 \ 0.5] \text{ and } \begin{bmatrix} -0.5 \\ 0 \\ 0.5 \end{bmatrix}$$

$(I_x)^2$ and $(I_y)^2$ are then calculated as is $I_x \cdot I_y$. This is done for each pixel in the image. Then, the coefficients a, b, and c, defined by $$a = \sum_{l=1}^{k^2} (I_x^l)_x^2, \quad (2)$$
$$b = \sum_{l=1}^{k^2} I_x^l \cdot I_y^l,$$
$$c = \sum_{l=1}^{k^2} (I_y^l)^2,$$

are obtained. The sum is extended over the pixels of 3×3 neighborhoods.

All of this is computed in parallel by three chains of adders, e.g. 400, that are interleaved with the pixel registers 402 and the delay line elements 404. The output from this arithmetic portion 406 then calculates the value of $$P(\lambda_t) = (a - \lambda_t)(c - \lambda_t) - b^2 \quad (3)$$
$$P(\lambda_t) > 0 \text{ and } a > \lambda_t \quad (4)$$

If the feature passes the test, then a specified operation occurs, e.g. a red pixel is sent to the video encoder. Otherwise the actual value is sent instead.

This system describes a specific processing technique. However, each processing stage operates according to an abstract model of the type shown in FIG. 4. Data is used to form the information. A pool of memory resources are used to build a pixel neighborhood. That pixel neighborhood is then shifted across the image associated with the input stream.

At every block cycle, the current values associated with the neighborhood feed a pipelined function block, computing some arithmetic function based on the input data. After an initial latency of one or more clock cycle, this block should be able to produce a result for each neighborhood associated with the input stream. The total latency of the block is thus given by the sum of the latency of the pipelined function block and the number of cycles needed to fill the delay lines/FIFOs so that the central pixel of the neighborhood corresponds to the first pixel of the input stream. These latency periods cause the output stream to be delayed with respect to the input stream. This delay comes as a phase shift. It is convenient to express this phase shift in terms of horizontal and vertical components, which represent respectively the number of vertical pixel columns and horizontal scan lines by which the output stream has to be shifted in order to be aligned with the input stream.

Some processing stages, like those computing $(I_x)^2$, $I_x \times I_y$ and $(I_y)^2$, do not need any or minimal memory resource. These products are defined for the components of the gradient associated with each individual pixel. Most stages, however, process pixel neighborhoods. Thus, a modular and efficient scheme for pixel neighborhood generation is important in realtime video processing systems.

In the preferred architecture, the memory resources used to build pixel neighborhoods are provided by external synchronous SDRAM memory devices, addressed according to the scheme presented in FIG. 3. The use of external memory devices, and the use of a special high speed system for generating a neighborhood, can significantly increase throughput.

A most critical section of the system in terms of timing requirements is the FPGA-to-memory interface. This interface is often clocked at up to 100 MHZ, the maximum clock speed supported by current generation FPGAs. The rest of the FPGA logic can run at the slower pixel clock rate, usually in the 12–40 MHZ range. In addition, the FPGA to memory interface can be easily determined from a high level investigation of the operation that is being mapped.

There is an additional observation that can be exploited to further increase the memory bandwidth of a system based on this architecture. FIG. 3 shows that the SDRAM addresses are generated according to a fixed pattern. The SDRAM address offset is M−k+1, where M is the width of the image in pixel units and k is the size of the neighborhood. Different neighborhood sizes, denoted by $k_m$, may be used at the different P stages of the algorithm by taking $$k = \max_{m=1,\ldots,P} k_m \quad (5)$$

and adjusting the length of the FIFO's used in each processing stage by inserting $k-k_m$ additional registers inside the FPGA's. Using this strategy, the address increment becomes constant. This property can be exploited to increase the memory bandwidth of the system as follows.

Memory devices are preferably addressed according to a fixed and repeating pattern:

1. FPGA writes data to memory location $l_{w1}$,
2. FPGA reads from memory location $l_{R1}=l_{W1}-(M-K+1)$,
3. FPGA reads data from memory location $l_{R2}=l_{R2}-(M-k+1)$,
4. Continue ...,
5. FPGA reads data from memory location $l_{Rk-1}=l_{Rk-2}-(M-k+1)$, 6. Increment pointers to read and write locations, 7. Go to 1.

Figure 6:
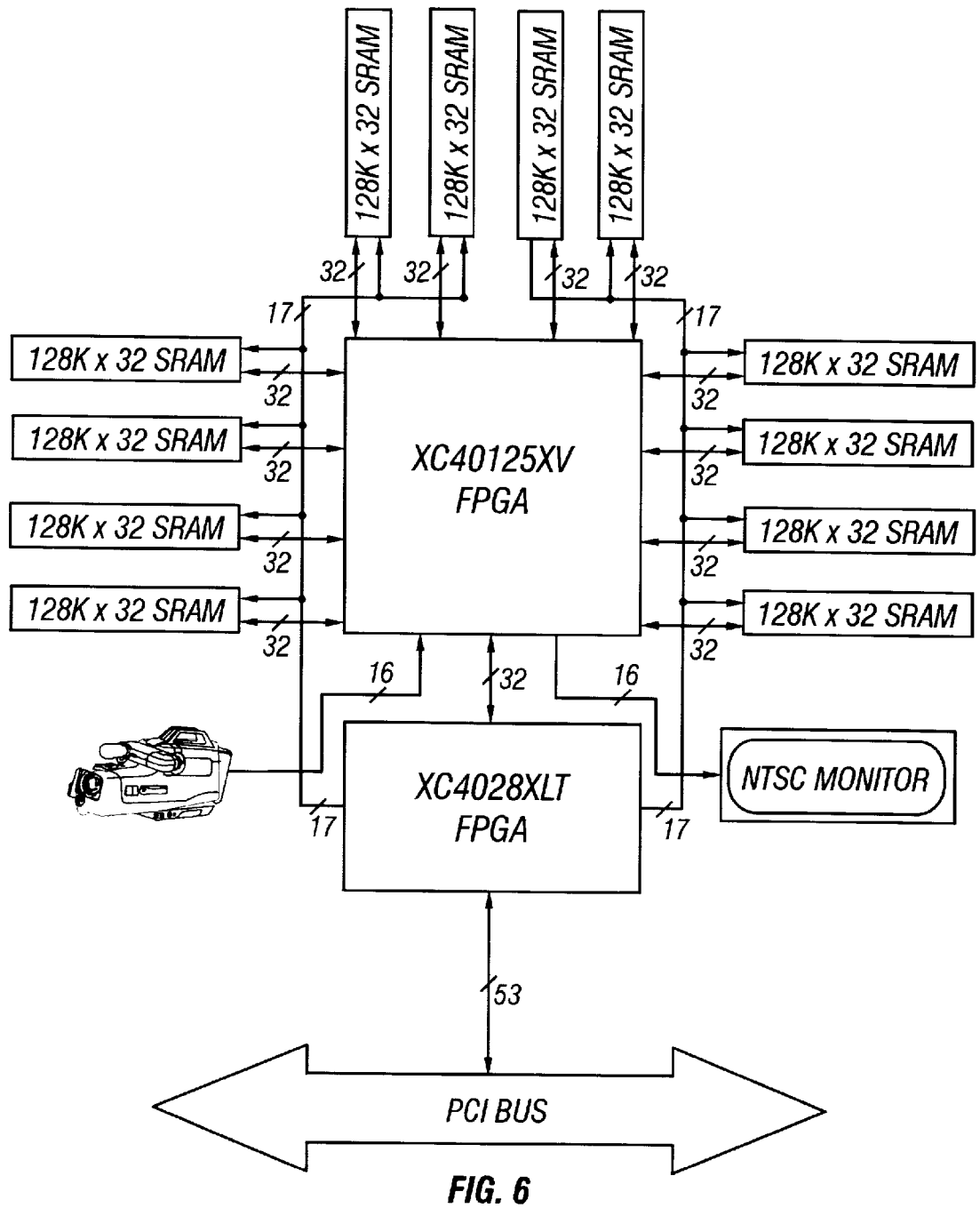
FIG. 6 shows a block diagram with the specific components that are used.

This property allows q of the address lines driving the memory devices to be shared between multiple addresses. These lines can be driven by a different programmable device, thus leading to a further increase in the utilization of FPGA pins. A high density and high pin count re-programmable device is available from Xilinx, the XC40125XV FPGA. The total number of I/O pins available to the user of this device is 448. FIG. 6 shows a block diagram of this system, in which 32 of these pins are dedicated to communication with the digital camera and video monitor and 32 pins to communication with the PCI bus interface chip. The remaining 384 pins are available for interfacing with external memory chips. Up to 12 of the 128K×32 bit external memory devices can be connected to the main FPGA. The number of FIFO memories that can fit in a single memory device depends on the widths of the data paths and on the constraint given by the fact that the delay lines implemented in the same device are necessarily cascaded.

Moreover, since the processing function performed by the FPGA can be changed, different intermediate operands of the image processing algorithm with different bit widths can be allocated to the delay lines implemented in the external memory device. The bandwidth of the FPGA to memory interface can be thus further maximized.

This architecture can achieve a memory bandwidth of 2.88 gigabytes/s accessing the memory at a conservative 60 MHZ clock rate. This rate represents a four to five times improvement with respect to existing reconfigurable computers. Sharing of the address lines is very important to achieve such a bandwidth. In fact, without sharing the address lines the maximum number of memory devices that can be connected to the FPGA drops from 12 to 7, and the bandwidth decreases by a similar factor.

The PCI interface can be an additional FPGA, configured to handle the interface with the PCI local bus and memory addressing. This FPGA generates two separate sets of address lines, each driving a separate SRAM bank. By using this scheme, it is possible to process both pixel neighborhoods, built by using the first memory bank, and entire frames, saved in the second bank, according to complex spatia-temporal filtering techniques.

Although only a few embodiments have been disclosed in detail above, many modifications are possible in the preferred embodiment without undue experimentation.

What is claimed is:

1. A computer system, comprising:

a field-programmable gate array; and an external memory, external to said field-programmable gate array;

said field-programmable gate array including configurable logic blocks which are configured in a way to share address lines that interface with said external memory; and wherein said configurable logic blocks are programmed to define a memory location, define a fixed increment for said memory location, and read data using said increment.

2. A system as in claim 1, wherein said configurable logic blocks are programmed to define a memory location, define at fixed increment for said memory location and read data using said increment to provide temporary storage for information needed to process a window of information.

* * * * *